United States Patent [19]

Kirk et al.

[11] Patent Number: 5,027,290

[45] Date of Patent: Jun. 25, 1991

[54] COMPUTER WORKSTATION INCLUDING VIDEO UPDATE ARRANGEMENT

[75] Inventors: John Kirk, Boxboro; George H. Lord, Stow, both of Mass.

[73] Assignee: Digital Equipment Corporation, Maynard, Mass.

[21] Appl. No.: 423,726

[22] Filed: Oct. 17, 1989

Related U.S. Application Data

[63] Continuation of Ser. No. 303,109, Jan. 25, 1989, abandoned, which is a continuation of Ser. No. 55,106, May 28, 1987, abandoned.

[51] Int. Cl.[5] .............................................. G06F 15/62

[52] U.S. Cl. .................................. 364/521; 364/518; 340/750

[58] Field of Search ... 364/521, 522, 518, 200 MS File, 364/900 MS File; 340/703, 728, 747, 750; 382/56

[56] References Cited

U.S. PATENT DOCUMENTS

| | | | |
|---|---|---|---|
| 4,570,217 | 2/1986 | Allen et al. | 364/188 |
| 4,656,596 | 4/1987 | Thaden et al. | 364/521 |
| 4,845,641 | 7/1989 | Ninomiya et al. | 364/518 |
| 4,876,651 | 10/1989 | Dawson et al. | 364/449 |

*Primary Examiner*—Dale M. Shaw

*Assistant Examiner*—Phu K. Nguyen

*Attorney, Agent, or Firm*—Finnegan, Henderson, Farabow, Garrett, and Dunner

[57] ABSTRACT

A computer workstation including a processor, one or more input/output units, such as disk devices or network interfaces, a program memory and a video memory which contains video information displayed on a video monitor. An arbitration circuit selects among the processor and input/output units for transfers to and from the program memory and video memory. A master control circuit controls timing of transfers to and from the program and video memories, and periodically enables video update transfers of video information from the video memory to video control circuits, which control the video monitor. While a video update is in progress, the master control circuit holds off other transfer request of the processor and input/output units with the memory. The program memory stores interrupt vectors. In response to interrupt requests from units which require interrupt service, the master control circuit interrupts the processor. When the processor acknowledges the interrupt, the master control circuit enables the transfer from the memory to the processor of the interrupt vector associated with the highest priority interrupt.

27 Claims, 2 Drawing Sheets

COMPUTER WORKSTATION INCLUDING VIDEO UPDATE ARRANGEMENT

This application is a continuation of Ser. No. 07/303,109, filed Jan. 25, 1989, now abandoned, which is a continuation of Ser. No. 07/055,106, filed May 28, 1987 now abandoned.

BACKGROUND OF THE INVENTION

1. Field of the Invention

The invention relates generally to the field of digital data processing systems, or computer systems, and more specifically to computer workstations.

2. Background

Until recently, computer systems were large, expensive machines, generally too expensive to devote an entire computer system to one person. However, with the development of large and very large scale integrated circuit technology, which in turn provided the microprocessor, providing a computer system to one person has become cost effective. Personal computers and the more advanced computer workstations permit one person to have sole access to his or her computer for many kinds of activities, including word processing, accounting and financial planning, and computer aided design and engineering. In many cases, the personal computers and workstations are connected over a network to a larger minicomputer or mainframe which provides large scale data storage and data base management capabilities and manages such auxiliary equipment as printers and telecommunication interfaces. These arrangements permit sharing of information among users working on the personal computers and workstations. In addition, the larger computer may perform complex or lengthy arithmetic calculations, such as recalculating spreadsheets and processing of engineering simulations.

A computer workstation generally includes a processor, a memory, auxiliary storage such as disk storage, a keyboard for user data entry and a video display for displaying output to the user. In addition, if the workstation is to be used in a network, a network interface will also be included. The processor includes a microprocessor chip and may also include one or more auxiliary processor chips for processing special classes of instructions, most notably floating point instructions. The memory includes a read only portion (ROM) which generally includes the boot portion of the operating system, read/write random access memory (RAM) which is used for program instruction and data storage, including the remainder of the operating system, and a video RAM which stores data depicting the image to be displayed on the video monitor.

When the workstation is initially turned on, the processor initially operates in response to bootstrap instructions from the boot ROM, and enables the remainder of the operating system and other programs and program data to be loaded into the RAM from the disk storage devices. During subsequent program execution, the processor may write data to be displayed into the video RAM. The network interface is also connected to the RAM to enable data from the network to be loaded therein or data to be retrieved therefrom for transmission over the network. Circuits for controlling the video display read the data out of the video RAM and in response to the data generate video signals which are coupled to the video display. Based on the video signals, the video display generates an image for the user.

The processor, disk storage devices, network interface and video control circuits are all connected to write data to or retrieve data from one or more portions of the memory. (User input through the keyboard is typically handled as an interrupt serviced by the processor rather than as a direct transfer to memory.) All portions of the memory, that is, the boot ROM, the RAM and the video RAM typically occupy a single address space, that is, the addresses of the locations in the boot ROM, RAM and video RAM do not overlap. In addition, the disk storage devices and network interface typically include control and status registers which also occupy a portion of the same address space. Thus, if the processor, for example, wishes to perform a transfer with any storage location in the boot ROM, RAM, video RAM or any of the control and status registers in the disk devices or network interface, the address transmitted by the processor during the transfer completely identifies the location.

The video image displayed by the video display unit is in "real time", that is, the generation of the image cannot be delayed without disrupting the image as seen by the viewer. Accordingly, the video control circuitry must be able to retrieve data from the video RAM in a timely manner. However, access to the memory can be impeded by memory requests from the processor, disk devices or network interface. Typically, a workstation includes an arbitration mechanism which arbitrates memory requests among the various devices, that is, the processor, video control circuitry, network interface and disk storage devices, which may be requesting access to memory. However, this requires a complex mechanism to ensure that the video control circuitry has access to the memory, and specifically the video RAM in a timely manner to ensure that the image on the video display is not disrupted.

SUMMARY OF THE INVENTION

The invention provides a new and improved computer workstation which ensures that the video control circuitry has timely access to the video RAM.

In brief summary, the new workstation includes a processor and input/output devices such as disk devices and/or network interfaces, and a master control circuit that controls accesses to a common memory which includes a video memory and enables transfers of video information from the video memory as required to ensure uninterrupted display on a monitor. The processor determines which unit, among itself, the disk devices or the network interface will be able to perform a transfer operation with memory. The master control circuit inhibits other units from accessing the memory while it is in the process of enabling transfers of video information from the video memory.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
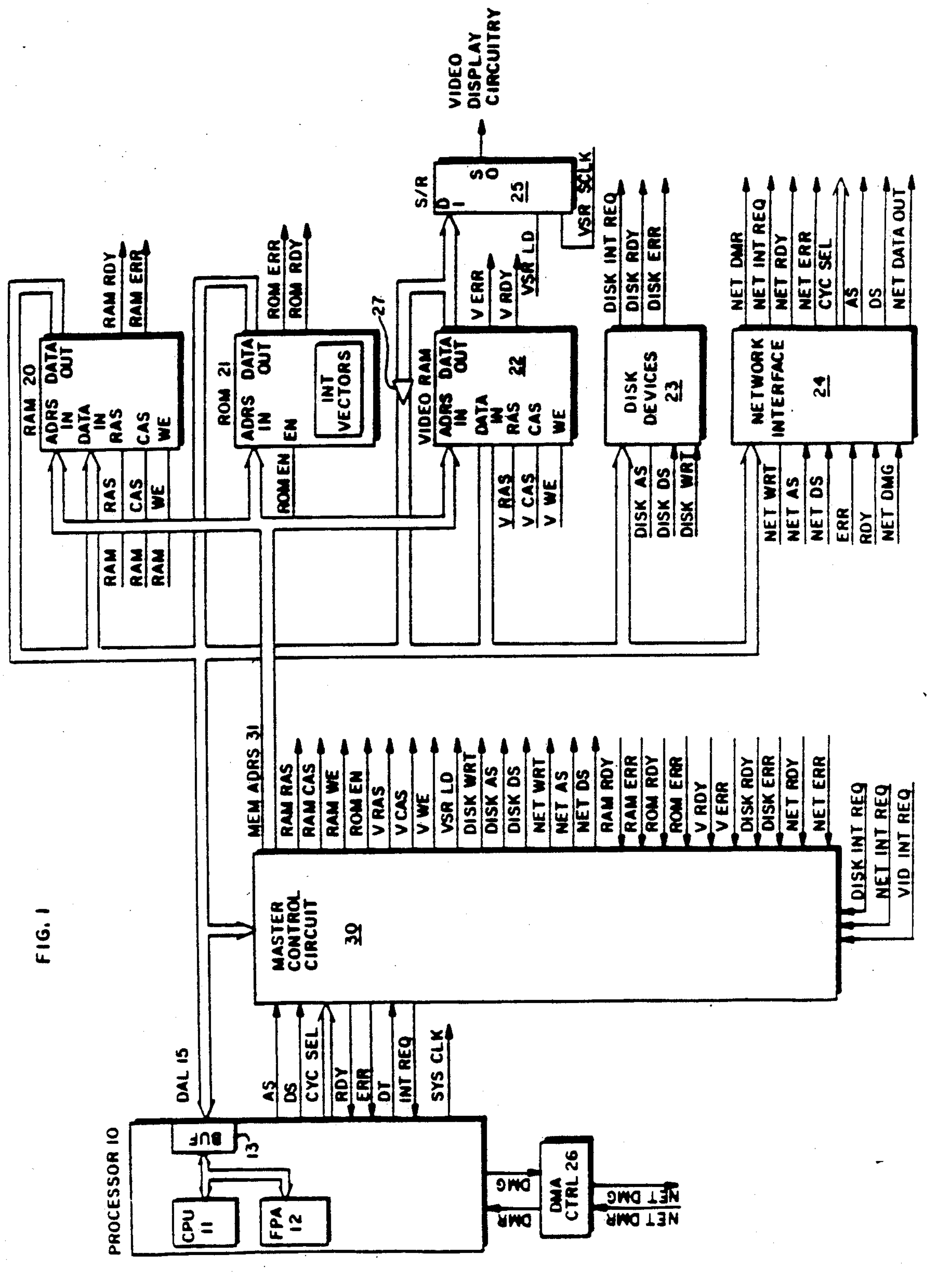
FIG. 1 depicts a general block diagram of a computer workstation constructed in accordance with the invention.

A computer workstation constructed in accordance with the invention is shown, in general block diagram form, in FIG. 1. With reference to FIG. 1, the workstation includes a processor 10 including a central processor unit (CPU) 11 and floating point accelerator processor 12 which transfer addresses and data, including such information as program instructions and program data, with other units in the system through a buffer 13. The floating point accelerator processor 12 is provided to accelerate processing of floating point instructions. The processor 10 generates and transmits a free-running SYS CLK system clock signal to synchronize events in the workstation. In one embodiment, the processor 10 operates in synchronism with a multiple phase clock, with the ticks of the SYS CLK system clock signal (that is, the successive leading edges of the SYS CLK system clock signal) defining the ticks of the successive phases of the processor's multiple phase clock.

The workstation also includes a read/write random access memory 20 containing a plurality of addressable storage locations for storing variable program instructions and data. A read only memory 21, which also contains a plurality of addressable storage locations, stores fixed program instructions, including a bootstrap program and selected portions of the operating system such as service routines used in servicing interrupt requests from, for example, input/output devices such as one or more disk devices 23 or a network interface 24 which may be included the system. The read only memory 21 also stores, at predetermined locations, a plurality of interrupt vectors 14. Each interrupt vector identifies the location, in either random access memory 20 or read only memory 21, of an interrupt service routine for servicing an interrupt request from units requiring interrupt service from the processor 10.

As is conventional, the system may also include other input/output devices, such as serial or parallel communications devices (not shown) which transfer information to or from the public telephone network and to printers for providing a hard copy output. Transfers to and from these devices are performed in a similar manner as transfers to and from the disk devices 23 and network interface 24, and so these additional devices will not be described further here.

In addition, a read/write random access memory serves as a video memory 22 to store, also in addressable storage locations, video data detailing an image to be displayed on a video monitor (not shown). In one specific embodiment, the video memory 22 contains a "bit-mapped" representation of the image to be displayed on the video display, that is, the data bits stored in the addressable locations in the video memory 22 have a direct correspondence to the individual picture elements (pixels) displayed.

As described below, the processor 10 can read the information stored in addressed locations in the random access memory 20, read only memory 21 and through a driver 27, video memory 22, and it can also write information to addressed locations in the random access memory 20 and, video memory 22.

In addition, periodically the information stored in a plurality of sequential locations in the video memory 22 is transferred in parallel form at one time to a shift register 25 to update its contents. Shift register 25 shifts its contents out in serial form to conventional video display control circuits (not shown) in response to a VSR SCLK video shift register shift clock signal from the video display control circuits. In response to the contents of the video shift register 25, the video display control circuits generate in a known manner video signals which control the video monitor and are displayed as an image.

It will be appreciated that the driver 27 serves to isolate the "data out" terminals of video memory 22 and, more particularly, the "data in" terminals of video shift register 25 from the data/address lines 15, since, as will be described in more detail below, the data/address lines 15 may have signals thereon during a video shift register update operation.

The processor 10 can also read information stored in control and status registers (not shown) in the disk devices 23 and network interface 24 and transfer information to such registers to control the respective units. The control and status registers are, like the storage locations in the random access memory 20, read only memory 21 and video memory 22, identified by addresses. In response to selected conditions, such as the detection of an error or the completion of a disk read or write operation, the disk devices 23 may assert a DISK INT REQ disk interrupt request signal. In addition, at the end of a network transfer, the network interface 24 may assert a NET INT REQ network interrupt request signal. The disk devices 23 may also assert the DISK INT REQ disk interrupt request signal during a disk storage operation to request the processor to transfer data to it from the memory 20, or to transfer data from it to the memory 20.

In addition, during the video monitor's vertical blanking interval, during which the electron beam is returned from the bottom of the video screen to the top of the video screen, the processor 10 is interrupted by a VERT BLK vertical blank interrupt request signal. In response to the VERT BLK vertical blank interrupt request signal, the processor 10 performs certain housekeeping operations as described below. The master control circuit 30 receives the DISK INT REQ disk interrupt request, NET INT REQ network interrupt request, and VERT BLK vertical blank interrupt request signals and at an appropriate time interrupts the CPU 11.

In addition, other units such as the aforementioned serial and parallel communications devices (not shown) typically also generate interrupt request signals to permit the processor 10 to perform selected operations therewith. The operations normally performed by a processor 10 for such devices are well known in the art and will not be described in detail.

The buffer 13 in processor 10 buffers transmissions of data and address information between the CPU 11 or floating point accelerator processor 12 and a set of data/address lines (DAL) 15. The data/address lines 15 are used to transfer data and address information from processor 10 during a write operation with other units in the system, that is, during a transmission to one of the memories 20 through 22, or to a control or status register in disk devices 23 or network interface 24. In addition, the data/address lines 15 are used during a read operation to return read data from the storage location or register identified by an address which is also transmitted by processor 10 over the data/address lines 15.

In one embodiment, thirty-six data/address lines 15 carry, in parallel, thirty-two information signals, which comprise four eight-bit bytes of information, and four parity signals (one associated with each byte) which are used in error detection.

As is typical, the network interface 24 is a direct memory access (DMA) device. That is, network interface 24 retrieves data directly from, in particular, random access memory 20 for transmission over a network (not shown). In addition, network interface 24 transmits data received from the network directly to random access memory 20 for storage therein.

The disk devices 23 may also comprise a direct memory access device, but in the embodiment described herein they are not. Instead, the processor 10 initiates the transfer of data to or from the disk devices 23 in response to an interrupt therefrom.

To initiate a DMA operation, the network interface 24 asserts an NET DMR network direct memory request signal. In response a DMA control circuit 26 asserts a DMR direct memory request signal which is transmitted to the processor 10. When the processor 10 is to grant a direct memory operation, it asserts a DMG direct memory grant signal, which is received by the DMA control circuit 26. The DMA control circuit then asserts the NET DMG network direct memory grant signal which enables the network interface 24 to engage in a DMA operation. If other devices are connected into the system which transfer data with memory 20 in a direct memory access manner, the DMA control circuit also receives device direct memory request signals therefrom and transfers device direct memory grant signals thereto. If more than one request signal is asserted when the processor 10 asserts the DMG direct memory grant signal, the DMA control circuit 26 asserts one of the device direct memory grant signals based on a predetermined priority in a conventional manner.

Like the processor 10, during a DMA operation the network interface 24 provides addresses to identify the location from which data is being retrieved or into which data is being written. DMA operations occur under control of control information in the control registers in the respective units which is provided by processor 10, but without intervention by processor 10 while the operations are occurring. As is conventional, at the end of a transfer operation, the unit asserts its NET INT REQ network interrupt request signal to request interrupt service by the processor 10.

In accordance with the invention, a master control circuit 30 controls the timing of transfers initiated by processor 10 with random access memory 20, read only memory 21 and video memory 22, and the control and status registers of disk devices 23 and network interface 24 over data/address lines 15. In addition, the master control circuit 30 controls refresh of the random access memory 20 and video memory 22 and the transfer of video information from the video memory 22 to the shift register 25 during a video shift register update operation. The master control circuit 30 further controls the timings of DMA transfers between the network interface 24 and random access memory 20. If a video shift register update operation is enabled, the master control circuit 30 holds off other operations which may be initiated by the processor 10 or network interface 24 until the video shift register update operation and subsequent refresh operations have completed. After the video shift register update operation has been completed, the master control circuit 30 enables other operations with memory to proceed from the appropriate cycle of the SYS CLK system timing signal.

Finally, the master control circuit receives interrupt request signals, such as the DISK INT REQ disk interrupt request, NET INT REQ network interrupt request and VID INT REQ video interrupt request signals, and other interrupt request signals from other devices (not shown) which may be in the system, and transmits a single INT REQ interrupt request signal to the processor 10. In response to a later interrupt acknowledge transaction, as described below, from the processor 10, the master control circuit enables the transfer of an interrupt vector from the read only memory 21 to the processor 10. The master control circuit 30 establishes an interrupt priority among the various units which generate interrupt request signals, and if more than one unit is asserting an interrupt request signal when the processor 10 initiates an interrupt acknowledge transaction, the master control circuit 30 enables the transfer of the interrupt vector associated with the unit having the highest priority whose interrupt request signal is asserted.

The processor 10 or network interface 24, to initiate a transfer with a memory unit, that is, either the random access memory 20, read only memory 21, or video memory 22, first places address signals on data/address lines 15 and asserts an AS address strobe signal and an encoded CYC SEL cycle select signal identifying a write operation if the operation is a write operation, that is, if data is to be stored in the location identified by the address. If the processor 10 is the initiating unit, this occurs in synchronism with a selected phase of the processor's internal multiple phase clock. If the operation is a read operation, in which data is to be retrieved from the location identified by the address, the CYC SEL cycle select signal is encoded to identify a read operation. Finally, if the operation is an interrupt acknowledge operation, the processor 10, which is the only unit which initiates this type of operation, transmits an encoded CYC SEL cycle select signal which identifies the operation as an interrupt acknowledge operation. In addition, if the processor 10 is the initiating unit, it transmits a DT data type signal to identify the number of bytes being transferred during a write operation or being retrieved during a read operation.

In response to the assertion of the AS address strobe signal, the master control circuit 30 latches the address signals on data/address lines 15, the encoded CYC SEL cycle select signal and the DT data type signal. A predetermined time later, the address signals are removed from the data/address lines 15. If the operation is a write operation, the data to be written is then placed on the data/address lines 15 and the DS data strobe signal is asserted. If the operation is a read operation or an interrupt acknowledge operation, the DS data strobe signal is asserted to indicate that the unit which initiated the operation, that is, either the processor 10 (in the case of a read operation or an interrupt acknowledge operation) or the network interface 24 (in the case of a read operation) which transmitted the address signals and CYC SEL cycle select signal, is ready to receive the data or interrupt vector.

After receiving the address signals from the data/address lines 15, if the operation is a read operation or a write operation, the master control circuit 30 decodes the address to determine whether the operation is a transfer with one of the memory units 20, 21 or 22. If it is, and if no update of the video shift register 25 or refresh operation is taking place, the master control circuit 30 transmits the address received from the data-/address lines 15 as MEM ADRS memory address signals over lines 31 to the address input terminals of memory units 20, 21 and 22.

As is typical in random access type memories, the random access memory 20 and video memory 22 require sequential transmission of row address signals accompanied by a row address strobe signal, and column address signals accompanied by a column address strobe signal, along with a write enable signal to identify the operation. Thus, if the transfer is with the random access memory 20, the master control circuit 30 transmits the row address signals as MEM ADRS memory address signals over lines 31, asserts a RAM WE random access memory write enable signal and a RAM RAS random access memory row address strobe signal which enables the random access memory 20 to latch the row address on lines 31 and the RAM WE random access memory write enable signal.

Thereafter, the master control circuit 30 removes the row address signals from lines 31 and transmits the column address as the MEM ADRS memory address signals over lines 31 and asserts a RAM CAS random access memory column address strobe signal. In particular, the RAM CAS random access memory column address strobe signal is a signal which is encoded in response to the DT data type signal to enable sufficient locations in the random access memory 20 to participate in the operation to store or retrieve the amount of data identified by the DT data type signal.

If the operation is a write operation, by this time, the write data is on data/address lines 15, and so the random access memory 20 stores the write data in the addressed location. Similarly, if the operation is a read operation, by this time the initiating unit is ready to receive the data from the identified location. The random access memory 20 then asserts a RAM RDY random access memory ready signal if no error has occurred, or a RAM ERR random access memory error signal if an error has occurred. An error may be indicated, for example, if the random access memory 20 detects a parity error in data received from data/address lines 15 if the operation is a write operation or retrieved from the location identified by the address if the operation is a read operation.

If no error is detected by random access memory 20, when the data has been loaded into the addressed location during a write operation, or when the read data is on data/address lines 15, the master control circuit 30 asserts the RDY ready signal. When the RDY ready signal has been asserted, the unit initiating the transfer latches the data on the data/address lines 15 if the transfer is a read operation. The initiating unit then negates the DS data strobe signal, in response to which the master control circuit 30 negates the RDY ready signal, and negates the AS address strobe signal to terminate the transfer.

During a transfer, if the master control circuit 30 detects a parity error in the address signals which it receives from data/address lines 15, the master control circuit 30 does not engage in any transmission of MEM ADRS memory address signals over lines 31, the RAM RAS random access memory row address strobe or RAM CAS random access memory column address strobe signals to the random access memory 20. Instead, the master control circuit 30, upon receipt of the asserted DS data strobe signal, asserts an ERR error signal.

A similar sequence occurs when address signals transmitted over the data/address lines 15 identify a location in the video memory 22. In that case, instead of RAM RAS random access memory row address strobe, RAM CAS random access memory column address strobe and RAM WE random access memory write enable signals, the master control circuit 30 transmits VRAS video row address strobe, VCAS video column address strobe and V WE video write enable signals. In addition, instead of the RAM RDY random access memory ready and RAM ERR random access memory error signals, the master control circuit 30 receives V RDY video ready and V ERR video error signals in response to the transfer.

Read only memory 21 requires only a single set of address signals transmitted over lines 31 along with a ROM EN read only memory enabling signal to initiate a transfer. If the address signals identify a location in the read only memory 21, the master control circuit 30 transmits the address signals over lines 31 and asserts the ROM EN enabling signal. In response, the read only memory 21 transmits the contents of the addressed location through its data out terminals and asserts either the ROM RDY or ROM ERR read only memory ready or error signals. In response to the receipt of the ROM RDY or ROM ERR read only memory ready or error signal, the master control circuit 30 asserts the corresponding RDY ready or ERR error signal.

The interrupt acknowledge operation is similar to a read operation described above, except that the processor 10 does not transmit address signals over data/address lines 15. Instead, the master control circuit 30 generates address signals which identify the location in read only memory 21 which stores the interrupt vector associated with the unit in the system with the highest interrupt priority. The master control unit 30 enables the read only memory 21 to transmit the interrupt vector over the data/address lines 15 with the same timing, with respect to the DS data strobe signal from processor 10, with which it enables transfers of data from memories 20 through 22 during a read operation.

As noted above, the processor 10 may also perform a read or write operation with control and status registers in disk devices 23 and network interface 24. In that case, the master control circuit 30 does not transmit address signals over lines 31; instead the disk devices 23 and network interface 24 receive the address signals and, if the operation is a write operation, data signals directly from the data/address lines 15. In addition, since the contents of an entire control and status register will always be loaded or retrieved, the DT data type signal is not used. The master control circuit 30 also receives the address signals, checks parity and determines whether they identify the disk devices 23 or network interface 24. If they do, it asserts a DISK AS disk address strobe or a NET AS network address strobe signal, which are received by the disk devices 23 and network interface 24, respectively.

In response to the DISK AS disk address strobe signal the disk devices 23 latch the address on the data/address lines 15 and the CYC SEL cycle select signal and identify the control and status register to engage in the transfer operation. Similarly, in response to the NET AS network address strobe signal, the network interface 24 latches the address on the data/address lines 15 and the CYC SEL cycle select signal and identifies the control and status register therein to engage in the transfer operation.

Thereafter, if the operation is a write operation, the processor 10 places the data signals on data/address lines 15 and asserts the DS data strobe signal. In response, the master control circuit 30 asserts the DISK DS disk data strobe if the DISK AS disk address strobe signal was previously asserted or the NET DS network data strobe signal if the NET AS network address strobe signal was previously asserted. If the DISK DS disk data strobe signal is asserted, the disk devices 23 receives the data from the data/address lines 15 if the operation is a write operation and if there is no parity error loads it into the control and status register identified by the previously latched address. If the operation is a read operation, the disk devices 23 retrieve the contents of the control and status register identified by the previously latched address and places it on the data/address lines 15. Thereafter, the disk devices 23 assert a DISK RDY disk ready signal if there was no error, or a DISK ERR disk error signal if an error had occurred.

In response to the assertion of a DISK RDY disk ready signal or the DISK ERR disk error signal, the master control circuit 30 asserts the RDY ready or ERR error signal, respectively, to indicate to the processor 10 completion of the operation. In response, the processor 10 negates the DS data strobe and AS address strobe signals. The master control circuit 30 then negates the DISK DS disk data strobe and DISK AS disk address strobe signals.

Similar operations occur in connection with transfers to and from control and status registers in the network interface 24. If a transfer from the processor 10 is to or from a control or status register in the master control circuit 30, the master control circuit 30 performs the requested transfer directly.

As described above, the master control circuit 30 controls transfers of video information from the video memory 22 to the video shift register 25. When the contents of the video shift register 25 have been shifted out to the video display circuitry (not shown), new video data must be transferred from the video memory 22 to the video shift register 25. This updates the video shift register 25 with additional video information which is shifted out to generate the image displayed on the monitor.

The video memory 22 and video shift register 25 are organized so that a row address and a column address of zero (that is, a column address in which all signals transmitted to the video memory 22 are negated) enables the video memory 22 to transmit sufficient information to fill video shift register 25. The master control circuit 30 transmits the row address as MEM ADRS memory address signals over the bus 31. A short time later, to allow the MEM ADRS memory address signals to settle, the master control circuit 30 asserts the VRAS video row address strobe signal to allow the video memory 22 to receive the MEM ADRS memory address signals. The master control circuit 30 then removes the row address signals, places negated MEM ADRS memory address signals on lines 31 as the column address and asserts the VCAS video column address strobe signal.

In response to the MEM ADRS memory address signals, the contents of the identified row of storage locations in the video memory 22 are transmitted in parallel as VID OUT video out signals through the video memory's data out terminals and received at the video shift register's data in terminals. A short time later, to allow the VID OUT video out signals to settle, the master control circuit 30 asserts a VSR LD video shift register load signal, enabling the video shift register 25 to load the VID OUT video out signals. The video display circuitry, which controls the video monitor (also not shown), generates a VSR SCLK video shift register shift clock signal to enable the data in the video shift register 25 to be shifted out in serial form. The video display circuitry uses the digital serial data from the video shift register 25 to generate analog signals defining the image displayed on the video monitor.

Immediately following an update of the video shift register 25, the master control circuit 30 initiates a series of successive refresh operations in random access memory 20. To accomplish this, the master control circuit 30 transmits MEM ADRS memory address signals over lines 31 to identify the row to be refreshed. After the MEM ADRS memory address signals have settled, the master control circuit 30 asserts the RAM RAS random access memory row address strobe signal which enables refresh to occur.

During a video shift register update operation or a refresh operation, the processor 10, disk devices 23 or network interface 24 may initiate a transfer operation over data/address lines 15. The master control circuit 30 latches the address signals which are transmitted over data/address lines 15 and the CYC SEL cycle select signal, but does not otherwise enable the operation to continue. Following the refresh operation, the master control circuit 30 proceeds with the operation. This permits the video shift register update operation and refresh operation to always have priority over other operations with respect to random access memory 20 and video memory 22.

Figure 2:
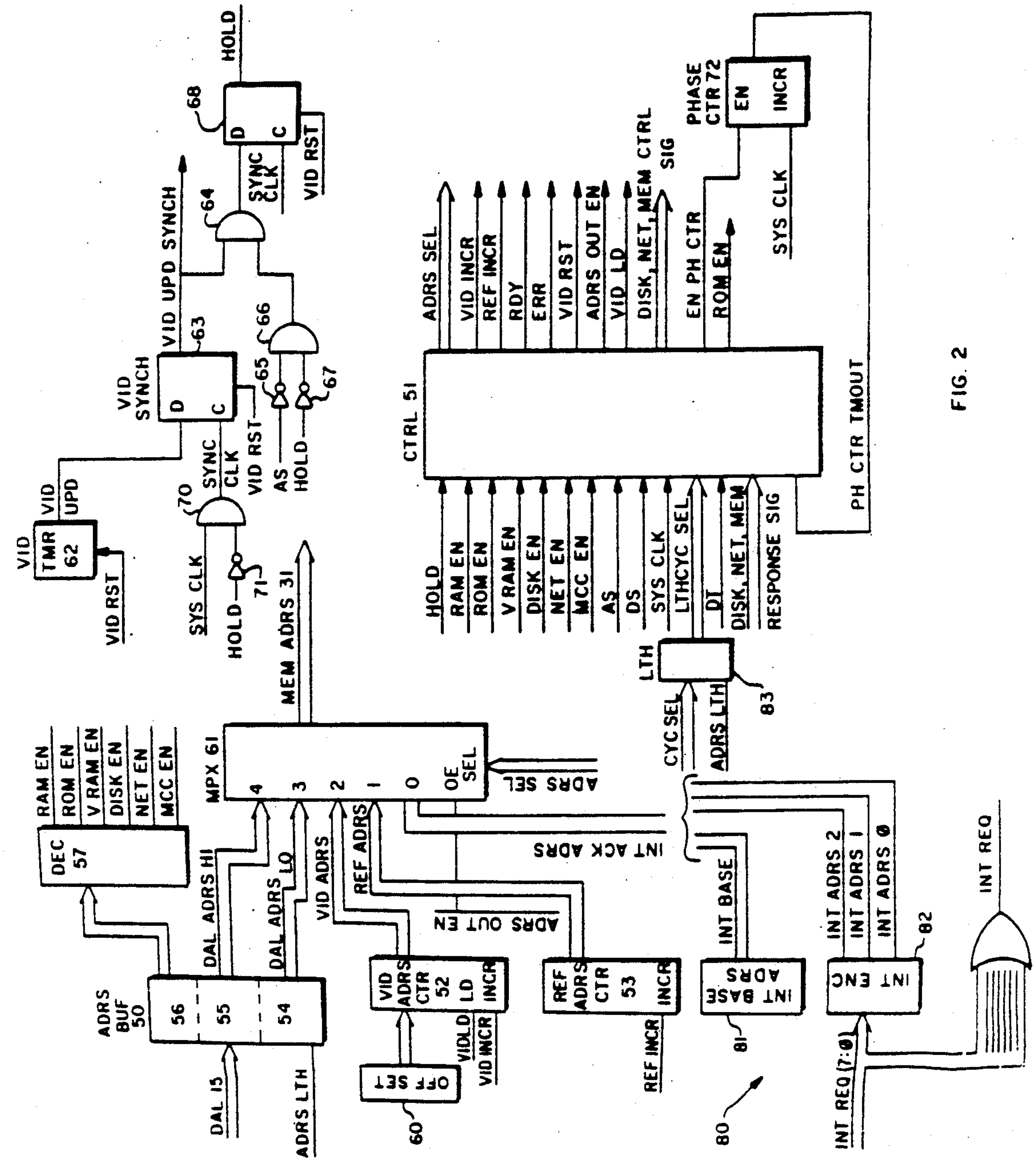
FIG. 2 depicts a functional block diagram of a master control circuit in the computer workstation depicted in FIG. 1.

The master control circuit 30 will be described in more detail in connection with FIG. 2, which depicts a functional block diagram of the master control circuit 30. With reference to FIG. 2, the master control circuit 30 has four sources of addresses which it may couple over address lines 31 as MEM ADRS memory address signals. In particular, the master control circuit 30 may receive address signals over data/address lines 15, which address signals are latched in an address buffer 50 in response to an ADRS LTH address latch signal from a control circuit 51. The control circuit 51 asserts the ADRS LTH address latch signal in response to the AS address strobe signal. At the same time that the address buffer 50 latches the address signals on data/address lines 15, a latch 83 latches the CYC SEL cycle select signals which identify a type of operation. The latch 83 provides LTH CYC SEL latched cycle select signals, which are coupled to the control circuit 51.

A second source of address signals is a video address counter 52, which generates VID ADRS video address signals which are used during a video shift register update operation. A third sources of addresses is a refresh address counter 53 that generates REF ADRS refresh address signals used during refresh operations which follow video shift register update operations. In one specific embodiment, six refresh operations follow each video shift register update operation. In addition, since video shift register operations in connection with video memory 22 are performed sufficiently often that refresh of the video memory 22 is not required, refresh operations are only performed in connection with the random access memory 20.

Finally, a fourth source of addresses is an interrupt address circuit 80, which provides an address of an interrupt vector during an interrupt acknowledge operation.

In one embodiment, the memory address lines 31 carry eight MEM ADRS (7:0) memory address signals in parallel, and the data/address lines 15 may carry as many as thirty two address signals in parallel. The address buffer 50 is divided into a low order portion 54 and an intermediate portion 55, both of which store signals which may be used to address the memories 20, 21 and 22 during a memory operation, and a high order portion 56 which latches signals which identify a particular device in the system depicted in FIG. 1.

The contents of the high order portion 56 of the address buffer 50 are coupled, as DAL DEV SEL data/address lines device select signals, to a decoder 57. In response to the DAL DEV SEL data/address lines device select signals, the decoder 57 asserts an RAM EN random access memory enable signal if the contents of the address buffer 50 identify a location in random access memory 20.

In addition, the decoder 57 asserts an ROM EN read only memory enable signal if the contents of the address buffer identify a location in read only memory 21 and a VRAM EN video memory enable signal if the contents of the address buffer 50 identify a location in video memory 22. Similarly, the decoder 57 asserts a DISK EN disk enable or NET EN network enable signal if the contents of the address buffer 50 identify a location in disk devices 23 or network interface 24, respectively.

Finally, the decoder 57 asserts an MCC EN master control circuit enable signal if a control or status register in the master control circuit 30 is addressed. One such register, namely, an offset register 60, is depicted in FIG. 2. The offset register 60 receives a value which is loaded into the video address counter 52 when the counter counts out. The value in the video address counter is an offset into the video memory's address space used by the processor 10. The contents of the offset register 60 may be updated in response to a VID LD video load signal from control circuit 51 during the monitor's vertical blanking interval, enabled during servicing by processor 10 of the vertical blanking interrupt as described above.

The interrupt address circuit 80 includes an interrupt base address register 81 which stores the base address of the interrupt vectors in read only memory 21 (FIG. 1) and a priority encoder 82. The priority encoder receives the interrupt request signals from the devices which may request interrupt service, which signals are identified in FIG. 2 as INT REQ (7:0) interrupt request signals (that is, eight INT REQ interrupt request signals) and generates three INT ADRS (2:0) interrupt address signals. The register 81 transmits INT BASE interrupt base signals which, in turn, comprise high order address bits which are used during an interrupt acknowledge operation. The priority encoder 82 provides INT ADRS (2:0) interrupt address signals which comprise three low order address bits which are concatenated onto the INT BASE interrupt base signals to provide INT ACK ADRS interrupt acknowledge address signals which are used during an interrupt acknowledge operation to identify the address of the location in read only memory 21 of the interrupt vector to be returned.

The contents of portions 55 and 54 of the address buffer 50 are transmitted as DAL ADRS HI data/address lines address high-order portion and DAL ADRS LO data/address lines address low-order portion signals, respectively, to two sets of input terminals of a multiplexer 61. In addition, the outputs of the video address counter 52 and refresh address counter 53 are transmitted as VID ADRS video address and REF ADRS refresh address signals, respectively, to two other sets of input terminals of multiplexer 61. The INT ACK ADRS interrupt acknowledge address signals are also coupled to a set of input terminals of multiplexer 61. Multiplexer 61 determines, in response to ADRS SEL address select signals at its select input terminals, the signals to be coupled onto lines 31 as MEM ADRS memory address signals. The multiplexer 61 transmits the signals at the input terminal identified by the ADRS SEL signals in response to an asserted ADRS OUT EN address out enable signal, which is received at an output enable terminal from the control circuit 51. The ADRS SEL address select signals are also provided by control circuit 51.

If the operation is a read or write operation, as defined by the LTH CYC SEL latched cycle select signal from latch 83, the control circuit 51 also generates the appropriate RAM WE random access memory write enable signal, V WE video random access memory write enable signal, DISK WRT disk devices write enable signal, or NET WRT network interface write enable signal, depending on the condition of the RAM EN random access memory enabling signal, ROM EN read only memory enabling signal, VRAM EN video random access memory enabling signal, DISK EN disk devices enabling signal, or NET EN network enabling signal from decoder 57. In addition, the control circuit 51 generates the DISK AS disk address strobe, DISK DS disk data strobe, NET AS network address strobe, NET DS network data strobe, RAM RAS and RAM CAS random access memory row and column address strobe, VRAM RAS and VRAM CAS video memory row and column address strobe signals. All of these signals are collectively identified in FIG. 2 as DISK, NET, MEM CTRL SIG disk, network and memory control signals to enable the operations with those devices as described above. Similarly, the control circuit 51 responds to the various DISK ERR, NET ERR, RAM ERR, ROM ERR and VRAM ERR error and DISK RDY, NET RDY, RAM RDY, ROM RDY and VRAM RDY ready signals, which are collectively identified as DISK, NET, MEM RESPONSE SIG disk, network and memory response signals, and generates the RDY ready and ERR error signals in response thereto.

On the other hand, if the operation is an interrupt acknowledge operation, the control circuit 51 generates ADRS SEL address select signals which enable the multiplexer 61 to transmit the INT ACK ADRS interrupt acknowledge address signals as MEM ADRS memory address signals over lines 31. The control circuit 51 also asserts a ROM EN read only memory enable signal which is coupled to read only memory 21 to enable it to couple the interrupt vector stored at the location identified by the INT ACK ADRS interrupt acknowledge address signals. At the appropriate time, the control circuit 51 asserts the RDY ready or ERR error signal for transfer to the processor 10.

The master control circuit 30 also includes a video timer 62 which periodically asserts a VID UPD video update signal to time updating of the video shift register 25. The VID UPD video update signal is coupled to a synchronizing flip-flop 63 which synchronizes the VID UPD video update signal to the SYS CLK system clock signal. Since a HOLD signal is not asserted, an inverter 71 enables one input of an AND gate 70 to pass the SYS CLK system clock signal from the processor 10 as SYNC CLK synchronizing clock signals to control two synchronizing flip-flops 63 and 68. On the next tick of the SYS CLK system clock signal (that is, when it is next asserted) after timer 62 asserts the VID UPD video update signal, flip-flop 63 latches the asserted VID UPD video update signal from timer 62 and generates an asserted VID UPD SYNC video update synchronized signal. The asserted VID UPD SYNC video update synchronized signal enables one input of an AND gate 64.

If the AS address strobe signal is in the asserted condition, indicating that a previously enabled operation is in progress, an inverter 65 disables one input of an AND gate 66. Since the HOLD signal is negated, an inverter 67 enables the second input of the AND gate 66. When the AS address strobe signal is negated at the end of the previously enabled operation, inverter 65 enables the second input of AND gate 66, which, in turn, energizes the AND gate 66. This, in turn, enables the second input of AND gate 64, thereby energizing it.

The energized AND gate 64 enables the data input terminal of flip-flop 68. At the next tick of the SYS CLK system clock signal, the flip-flop is set, which asserts the HOLD signal.

The HOLD signal is coupled to control circuit 51. When the HOLD signal is asserted, the control circuit is enabled to generate the signals described above to perform the video shift register update operation, followed by the refresh operations. In particular, the control circuit 51 initially generates ADRS SEL address select signals and asserts the ADRS OUT EN address out enable signal to enable the video address counter 52 to couple the VID ADRS video address signals from the video address counter 52 onto lines 31 as the MEM ADRS memory address signals. A selected time later, after the MEM ADRS memory address signals have had a chance to settle, the control circuit 51 asserts the VRAS video row address strobe signal.

A selected time later the control circuit 51 enables the multiplexer 61 to transmit MEM ADRS memory address signals of all zeros by negating the ADRS OUT EN address out enable signal. A selected time later, after these MEM ADRS memory address signals have settled, the control circuit 51 asserts the VCAS video column address strobe signal. In response, the video memory 22 transmits VID OUT signals sufficient to fill video shift register 25, and the control circuit 51 asserts the VSR LD video shift register load signal to enable the video shift register 25 to load the VID OUT signals. The control circuit 51 then negates the VRAS and VCAS video row and column address strobe signals and asserts a VID INCR video increment signal which enables the video address counter 52 to increment.

Thereafter, the control circuit 51 enables a succession of refresh operations to occur in random access memory 20. In particular, the control circuit 51 generates ADRS SEL address select signals and asserts the ADRS OUT EN address out enable signal which enable the multiplexer 61 to couple the REF ADRS refresh address signals from refresh address counter 53 onto lines 31 as the MEM ADRS memory address signals. A selected time later, after the MEM ADRS memory address signals have settled, the control circuit 51 asserts the RAM RAS random access memory row address strobe signal to enable the identified row of storage locations in the random access memory 20 to be refreshed. The control circuit 51 then negates the RAM RAS random access memory row address strobe signal to terminate the refresh operation and asserts a REF INCR refresh increment signal which enables the refresh address counter 53 to increment. This process is repeated a selected number of times to allow multiple rows in random access memory 20 to be refreshed.

During this time, the HOLD signal remains asserted. While the HOLD signal is asserted, inverter 67 disables AND gate 66 so that a change in the condition of the AS address strobe signal does not affect the condition of AND gate 64. The asserted HOLD signal disables AND gate 70 to isolate the flip-flops 63 and 68 from the SYS CLK system clock signal. Thus, after the HOLD signal is asserted, the successive ticks of the SYS CLK system clock signal by the processor 10 do not affect the respective conditions of the flip-flops 63 and 68. At the end of the refresh operations, the control circuit 51 asserts a VID RST video reset signal which causes video timer 52 and flip flops 63 and 68 to reset.

As described above, the processor 10, disk devices 23 or network interface 24 may attempt to initiate a transfer while a video shift register update operation or refresh operation is in progress, and, as part of that transfer, the AS address strobe signal is asserted. In response to the assertion of the AS address strobe signal, the control circuit 51 ensures that the RDY ready signal is at a negated level. In addition, the control circuit 51 asserts the ADRS LTH address latch signal which enables the address buffer 50 to latch the address signals on the data/address lines 15.

Furthermore, the control circuit 51 asserts an EN PH CTR enable phase counter signal which is coupled to a phase counter 72. The asserted EN PH CTR enable phase counter signal enables the phase counter 72 to load and thereafter increment in response to the successive SYS CLK system clock signals from processor 10. The control circuit 51 uses the phase counter 72 to synchronize restarting of the transfer operation following termination of the video shift register update operation and refresh operations, so as to ensure that the memory operation initiated by, for example, the processor 10, is restarted in synchronism with the same clock phase of processor 10 during which the processor 10 began the transfer operation.

That is, if processor 10 initiates a transfer operation in synchronism with phase 2 of a four phase clock, the control circuit restarts the transfer operation, after the video shift register update operation and refresh operations, in synchronism with phase 2. The control circuit 51 does not, however, receive a signal corresponding to the processor's clock phases, and so it uses phase counter 72 to count clock phases in response to the SYS CLK system clock signal, which is ticked to identify the ticks of the processor's successive clock phases. When the phase counter 72 counts out, it asserts a PHASE CTR TMOUT phase counter time out signal which is coupled to control circuit 51. If the control circuit has not performed all of the successive refresh operations, it again asserts the EN PH CTR enable phase counter signal to enable the phase counter 72 to reload. On the other hand, if the control circuit 51 has enabled the last refresh operation, when the phase counter asserts the PHASE CTR TMOUT phase counter time out signal, the control circuit 51 then initiates the transfer operation previously enabled by the processor 10, disk devices 23 or network interface 24, using the address latched in the address buffer 50, as described above.

The system depicted in the Figs. ensures that the video data will be transferred from the video memory 22 to the video shift register 25 expeditiously on the timing out of the video timer 62, even though other units in the system may wish to access one or more of the memories, including the video memory 22. The master control circuit ensures that this transfer can take place, even while other units may wish to perform a transfer to or from the memory. The processor 10, on the other hand performs arbitration, allowing only one unit to attempt to access a memory at a time to perform a direct memory access operation.

In addition, the system simplifies interrupt processing. In particular, the system enables a number of interrupt request signals to be accumulated and coupled to the processor as a single interrupt request signal. In addition, if a number of units are requesting interrupts, the master control circuit may select one of them according to some order of priority. Further, the system facilitates simplification of the various units which can be connected into it, as the units do not have to have the interface circuitry to respond to the interrupt acknowledge operations or transfer their interrupt vectors. Finally, the system simplifies changing the interrupt vectors, since they are all located in a single unit, namely, the read only memory 21.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

The invention claimed is:

1. A computer system comprising:

A. video information storage means for storing video information in a plurality of video information storage locations, said video information storage means including video address input means, video information input means, and video information output means;

B. video means connected to said video information output means for receiving video information from said video information storage means for display;

C. a plurality of utilization means, all of which are connected to said video information input means and said video information output means, for transferring video information to and from said video information storage means, said utilization means including video address transmitting means for providing a video address, video information transmitting means connected to said video information input means for providing video information to said video information input means for storage in said video information storage locations, and video information receiving means connected to said video information output means for receiving video information;

D. arbitration means connected to all of said utilization means for enabling one of said utilization means to perform a video information transfer with said video information storage means; and E. access control means connected to all of said utilization means, including:

i. address storage means connected to the video address transmitting means in said utilization means for latching the video address provided from the one of said utilization means enabled by said arbitration means;

ii. video update address generation means for generating a video address;

iii. coupling means connected to said address storage means and said video update address generation means for selectively coupling the video address latched in said address storage means or the video address generated by said video update address generation means to said video address input means of said video information storage means;

iv. control means, connected to said coupling means, said address storage means and said video update address generation means, for controlling said coupling means to normally transfer the video address latched in said address storage means to said video address input means, for providing video transfer control signals to enable a transfer of video information between one of said plurality of utilization means and a storage location in said video information storage means identified by the video address latched in said address storage means, for controlling said coupling means to transfer the video address generated by said video update address generating means, for providing video update control signals to enable a transfer of video information from the storage location identified by the video address generated by said video update address generation means to said video means to thereby perform a video update operation, and for inhibiting access by said utilization means to said video information storage means during the video update operation; and v. timer means for generating a video update timing signal to enable initiation of the video update operation, wherein said control means initiates the video update operation in response to generation of said video update timing signal.

2. A computer system as defined in claim 1 wherein said utilization means includes means for providing a program address for latching in said address storage means;

said computer system further comprising program information storage means having program address input means, program information input means, and program information output means, said utilization means being connected to said program information input means and program information output means, said coupling means also being connected to said program address input means for selectively coupling said address latched in said address storage means to said program address input means;

said control means further including program control means for providing program information transfer control signals for enabling a transfer between said utilization means and said program information storage means; and said access control means further including means connected to said address storage means for identifying whether the address stored in said address storage means identifies a location in said program information storage means or said video information storage means and for selectively enabling said control means to provide video transfer control signals or program information transfer control signals.

3. A computer system as defined in claim 2 wherein said access control means further includes:

refresh address generating means, connected to said coupling means, for generating a refresh address; and refresh control means for providing refresh control signals or enabling said coupling means to couple said refresh address to said program information storage means to enable a refresh operation to occur.

4. A computer system as defined in claim 2 wherein said timer means includes timing signal generating means for generating a timer signal and synchronization means connected to said control means and said timer means for generating the video update timing signal in response to the timer signal after a prior transfer operation has been completed.

5. A digital computer system, comprising:

memory means for storing digital information in a plurality of addressable storage locations, said information including program data stored in program data storage locations and video data stored in video data storage locations;

address receiving means, including in said memory means, for receiving an address identifying a storage location;

memory control signal receiving means, included in said memory means, for receiving memory control signals;

video means, operatively coupled to said memory means, for receiving video data from said memory means for display;

a plurality of memory utilization means, operatively coupled to said memory means, for transferring information to and from said memory means;

arbitration means, operatively coupled to said plurality of memory utilization means, for enabling one of said memory utilization means to initiate an information transfer with said memory means;

global timing means for generating a global timing signal;

memory control means, operatively coupled to said memory means and said plurality of memory utilization means, for controlling access by said plurality of memory utilization means to said memory means, and for controlling said memory means to transfer the video data stored in a predetermined portion of said video data storage locations to said video means;

wherein said memory control means includes video address generating means for generating a video address that identifies the predetermined portion of said video data storage locations that contain video data to be transferred to said video means, coupling means, operatively coupled to said video address generating means and said address receiving means, for coupling the video address generated by said video address generating means to said address receiving means, video timer means, operatively coupled to receive the global timing signal, for generating a video transfer enable signal, and control circuit means, responsive to said video transfer enable signal and operatively coupled to said video address generating means, said coupling means, said memory means, and said video means, for providing a first control signal to cause said memory means to transmit to said video means the video data stored at the predetermined portion of said video data storage locations identified by the video address generated by said video address generating means, for providing a second control signal to cause said video means to receive the video data, and for inhibiting access by said memory utilization means to said memory means while video data is transferred from said memory means to said video means.

6. The digital computer system of claim 5 wherein said video timer means includes:

a video timer for periodically generating a video update signal that is prerequisite to initiating each transfer of video data to said video means; and logic means, responsive to the video update signal and the global timing signal, for generating the video transfer enable signal.

7. The digital computer system of claim 6 wherein:

each memory utilization means includes means for providing a memory access control signal to said memory control means to initiate an information transfer with said memory means;

said logic means including means for blocking generation of the video transfer enable signal while the memory access control signal is being received by said memory control means; and wherein the transfer of video data to said video means cannot be initiated while one of said memory utilization means is transmitting the memory access control signal.

8. The digital computer system of claim 7 wherein:

each of said memory utilization means includes means for providing a memory address to identify a location in said memory means with respect to which the information transfer is to occur;

said memory control means includes memory address latch means, operatively coupled to said plurality of memory utilization means, for latching the memory address transmitted by the memory utilization means enabled by said arbitration means; and said control circuit means includes means for providing a coupling means control signal to cause said coupling means to selectively transfer the memory address latched in said memory address latch means to said memory means, said control circuit means inhibiting transfer of the latched memory address to said memory means while the video transfer enable signal is asserted.

9. The digital computer system of claim 8, wherein:

said memory control means includes phase counter means; and said control circuit means includes means for providing a phase counter enable signal to enable said phase counter means to initiate operation in response to the memory access control signal transmitted by said memory utilization means while the video transfer enable signal is asserted, said memory control means enabling a memory transfer corresponding to the memory address stored in said memory address latch means in response to the counting out of said phase counter means following completion of the transfer from said memory means to said video means.

10. The digital computer system of claim 9, wherein: said memory control means further includes refresh address generating means, coupled to said coupling means, for generating a refresh address; and said control circuit means includes means for providing a refresh coupling control signal to control said coupling means to transfer said refresh address to said memory means, and means for providing refresh memory control signals to initiate and control a refresh operation.

11. The digital computer system of claim 10 wherein: said control circuit means initiates the refresh operation following completion of the transfer of video information from said memory means to said video means; and said control circuit means inhibits the information transfer corresponding to the memory address latched in said memory address latch means until completion of the refresh operation.

12. The digital computer system of claim 11 wherein: said control circuit means is responsive to assertion of said video transfer enable signal to inhibit access by said memory utilization means to said memory means; and said control circuit means includes means for providing to said logic means a video reset signal for resetting the video transfer enable signal following completion of the refresh operation.

13. The digital computer system of claim 10 wherein: said control circuit means is responsive to assertion of said video transfer enable signal to inhibit access by said memory utilization means to said memory means; and said control circuit means includes means for providing to said logic means a video reset signal for resetting the video transfer enable signal following completion of the transfer of video data from said memory means to said video means and the refresh operation.

14. The digital computer system of claim 9 wherein: said video address generating means comprises a video address counter; and said control circuit means includes means for providing a video address counter increment signal following completion of the transfer of video data from said memory means to said video means.

15. The digital computer system of claim 10 wherein said video address generating means comprises a video address counter; and said control circuit means includes means for providing a video address counter increment signal following completion of the transfer of video data from said memory means to said video means.

16. The digital computer system of claim 5 wherein: said video address generating means comprises a video address counter; and said control circuit means includes means for providing a video address counter increment signal following completion of the transfer of video data from said memory means to said video means.

17. The digital computer system of claim 5 wherein: said control circuit means is responsive to assertion of said video transfer enable signal to inhibit access by said memory utilization means to said memory means; and said control circuit means includes means for providing a video reset signal for resetting the video transfer enable signal following completion of the transfer of video data from said memory means to said video means.

18. A digital computer system, comprising:

memory means for storing digital information in a plurality of addressable storage locations, said information including program data stored in program data storage locations and video data stored in video data storage locations;

address receiving means, included in said memory means, for receiving an address identifying a storage location;

memory control signal receiving means, included in said memory means, for receiving memory control signals;

video means, operatively coupled to said memory means, for receiving video data from said memory means for display;

a plurality of memory utilization means, operatively coupled to said memory means, for transferring information to and from said memory means;

arbitration means, operatively coupled to said plurality of memory utilization means, for enabling one of said memory utilization means to initiate an information transfer with said memory means;

global timing means for generating a global timing signal;

memory control means, operatively coupled to said memory means and said plurality of memory utilization means, for controlling access by said plurality of memory utilization means to said memory means, and for controlling said memory means to transfer the video data stored in a predetermined portion of said video data storage locations to said video means;

wherein said memory control means includes video address generating means for generating a video address that identifies the predetermined portion of said video data storage locations that contain video data to be transferred to said video means, refresh address generating means for generating a refresh address, coupling means, operatively coupled to said video address generating means, said refresh address generating means and said address receiving means, for coupling to said address receiving means either the generated video address or the generated refresh address, video timer means, operatively coupled to receive the global timing signal, for generating a video transfer enable signal, and control circuit means, responsive to said video transfer enable signal and operatively coupled to said video address generating means, said coupling means, said memory means, and said video means, for providing a first control signal to cause said coupling means to couple to said memory means the generated video address, for providing a second control signal to cause said memory means to transmit to said video means the video data stored at the predetermined portion of said video data storage locations identified by the generated video address, for providing a third control signal to cause said video means to receive the video data, for providing a fourth control signal to cause coupling means to couple to said memory means the generated refresh address, for providing a fifth control signal to initiate and control a refresh operation, and for inhibiting access by said memory utilization means to said memory means during the transfer of video data from said memory means to said video means and during the refresh operation.

19. The digital computer system of claim 18 wherein said video timer means includes:

a video timer for periodically generating a video update signal that is prerequisite to initiating each transfer of video data to said video means; and logic means, responsive to the video update signal and the global timing signal, for generating the video transfer enable signal.

20. The digital computer system of claim 19 wherein:

each memory utilization means includes means for providing a memory access control signal to said memory control means to initiate an information transfer with said memory means; and said logic means including means for blocking generation of the video transfer enable signal while the memory access control signal is being received by said memory control means;

wherein the transfer of video data to said video means cannot be initiated while one of said memory utilization means is transmitting the memory access control signal.

21. The digital computer system of claim 20 wherein each of said memory utilization means includes means for generating and transmitting a memory address to identify a location in said memory means with respect to which the information transfer is to occur;

said memory control means includes memory address latch means, operatively coupled to said plurality of memory utilization means, for latching the memory address transmitted by the memory utilization means enabled by said arbitration means; and said control circuit means includes means for providing a coupling means control signal to cause said coupling means to selectively transfer the memory address latched in said memory address latch means to said memory means, said control circuit means inhibiting transfer of the latched memory address to said memory means during the transfer of video data from said memory means to said video means and during the refresh operation.

22. The digital computer system of claim 21, wherein:

said memory control means includes phase counter means; and said control circuit means includes means for providing a phase counter enable signal to enable said phase counter means to initiate operation in response to the memory access control signal transmitted by said memory utilization means while the video transfer enable signal is asserted, said memory control means enabling a memory transfer corresponding to the memory address latched in said memory address latch means in response to the counting out of said phase counter means following completion of the transfer from said memory means to said video means and the refresh operation.

23. The digital computer system of claim 18 wherein:

each memory utilization means includes means for providing a memory access control signal to said memory control means to initiate an information transfer with said memory means;

said video timer means includes:

a video timer for periodically generating a video update signal that is prerequisite to initiating each transfer of video data to said video means; and logic means, responsive to the video update signal and the global timing signal, for generating the video transfer enable signal, wherein said logic means includes means for blocking generation of the video transfer enable signal while the memory access control signal is being received by said memory control means;

each memory utilization means includes means for providing a memory address to identify a location in said memory means with respect to which an information transfer is to occur;

said memory control means further including memory address latch means, operatively coupled to said plurality of memory utilization means, for latching the memory address transmitted by the memory utilization means enabled by said arbitration means;

said control circuit means includes means for providing a coupling means control signal to cause said coupling means to selectively transfer the memory address latched in said memory address latch means to said memory means;

said control circuit means initiating the refresh operation following completion of the transfer of video data from said memory means to said video means; and said control circuit means inhibiting the information transfer corresponding to the memory address latched in said memory address latch means until completion of the refresh operation.

24. The digital computer system of claim 23 wherein said video address generating means comprises a video address counter; and said control circuit means includes means for providing a video address counter increment signal following completion of the transfer of video data from said memory means to said video means.

25. The digital computer system of claim 23 wherein:

said control circuit means is responsive to assertion of said video transfer enable signal to inhibit access by said memory utilization means to said memory means; and said control circuit means includes means for providing a video reset signal for resetting the video transfer enable signal following completion of the refresh operation.

26. The digital computer system of claim 18 wherein said video address generating means comprises a video address counter; and said control circuit means including means for providing a video address counter increment signal following completion of the transfer of video data from said memory means to said video means.

27. The digital computer system of claim 18 wherein:

said control circuit means is responsive to assertion of said video transfer enable signal to inhibit access by said memory utilization means to said memory means; and said control circuit means includes means for providing a video reset signal for resetting the video transfer enable signal following completion of the transfer of video data from said memory means to said video means and the refresh operation.

* * * * *

UNITED STATES PATENT AND TRADEMARK OFFICE
CERTIFICATE OF CORRECTION

PATENT NO. : 5,027,290

DATED : June 25, 1991

INVENTOR(S) : John Kirk and George H. Lord

It is certified that error appears in the above-identified patent and that said Letters Patent is hereby corrected as shown below:

Column 17:

Claim 3, line 7, "or" should read --for--.

Column 22:

After claim 27, insert the following claim.

28. A computer system as defined in claim 3 wherein said refresh address generating means includes counter means for providing the refresh address, said refresh control means providing an increment signal to cause said counter means to increment following each refresh operation.

Signed and Sealed this

Nineteenth Day of October, 1993

Attest:

Bruce Lehman

BRUCE LEHMAN

*Attesting Officer*

*Commissioner of Patents and Trademarks*